US006380863B1

(12) United States Patent
Swoboda et al.

(10) Patent No.: US 6,380,863 B1
(45) Date of Patent: Apr. 30, 2002

(54) SIGNAL FLAG AND SIGNALLING SYSTEM FOR MOTOR RACING

(75) Inventors: Christian Swoboda, Volksgartenstrasse 22, 4020 Linz; Horst Stadler, Traun, both of (AT)

(73) Assignee: Christian Swoboda, Linz (AT)

( * ) Notice: Subject to any disclaimer, the term of this patent is extended or adjusted under 35 U.S.C. 154(b) by 0 days.

(21) Appl. No.: 09/429,795

(22) Filed: Oct. 29, 1999

(30) Foreign Application Priority Data

Oct. 30, 1998 (AT) .......... 710/98 U
Oct. 5, 1999 (AT) .......... 1700/99

(51) Int. Cl.[7] .......... G08B 5/00; B60Q 7/00

(52) U.S. Cl. .......... 340/815.4; 340/908; 340/321; 340/323 R; 40/586; 116/113

(58) Field of Search .......... 340/815.4, 815.45, 340/908, 908.1, 321, 323 R, 471, 473, 331, 332; 116/202, 278, 173; 40/558, 586, 612; 362/800

(56) References Cited

U.S. PATENT DOCUMENTS

| | | | | |
|---|---|---|---|---|
| 1,171,917 A | * | 2/1916 | Axford | 116/173 |
| 1,256,232 A | * | 2/1918 | Howard | 116/173 |
| 4,633,215 A | | 12/1986 | Anders et al. | 340/84 |
| 4,833,443 A | | 5/1989 | Siew | 340/473 |
| 4,949,067 A | | 8/1990 | Martell | 340/323 |
| 6,067,013 A | * | 5/2000 | Pejic | 340/539 |
| 6,192,824 B1 | * | 2/2001 | Chang | 116/173 |

FOREIGN PATENT DOCUMENTS

| | | | |
|---|---|---|---|
| DE | 196 32 719 | 2/1998 | G09F/17/00 |
| EP | 0 325 255 | 7/1989 | E01F/09/01 |
| GB | 2156 061 | 10/1985 | F21L/3/00 |
| WO | WO 93/15494 | 8/1993 | G09F/13/20 |

* cited by examiner

*Primary Examiner*—Donnie L. Crosland
(74) *Attorney, Agent, or Firm*—The Maxham Firm

(57) ABSTRACT

Signal flags for use in motor racing which are shown or waved by section observers on racing courses and respectively consist of a colored flag cloth as well as a flag rod provided with a handle. On the flag rod of each flag at least one light emitting element is provided, preferably in the form of an electric blinking lamp which emits light with a high intensity in the color of the flag cloth. Further, the invention relates to a signalling system for motor racing including such signal flags and comprising a common accommodation with mounts for the individual signal flags, an additional blinking device including blinking lamps emitting light in the colors of the signal flags as well as an electronic control device for operating the signal flags and the blinking device.

15 Claims, 2 Drawing Sheets

SIGNAL FLAG AND SIGNALLING SYSTEM FOR MOTOR RACING

BACKGROUND

1. Field of Invention

The invention relates to signal flags and a signalling system for motor racing, particularly for section observers on racing courses.

2. Discussion of Related Art

As is commonly known, the section observers prescribed by the regulations in motor racing have, among others, the duty to observe the section of the racing course allocated to them and to transmit certain information and instructions to the drivers. For this purpose, each section observer has a predetermined number, generally at least six, signal flags in different colors. By waving one of these flags, a certain racing situation is indicated to the drivers, and a corresponding instruction or warning is given. Among these signal flag colors, "yellow" indicates an accident, danger and that passing is prohibited, "red"—a termination of the race, "blue"—let pass, "green"—free track, "white"—service vehicles or slower racing cars are on the course, and "yellow-red"—a contamination of the race track and oil. For the drivers to securely recognize the respective signal color the respective position of the section observer must be in the direct field of vision of the drivers.

For reasons of safety, present day racing courses have widened lateral roll spaces and elastic barriers between the race track and the audience. Since the section observers also have to be positioned on the outside of these roll spaces, due to the increase of the distance between the drivers and the section observers, danger has increased that a section observer waving a selected signal flag may be overlooked or not noticed in time. These risks are particularly severe, for example, during so called rain races, since the wetness of the track is converted into a fine spray mist which may severely affect the vision of the drivers. Particular problems are further caused in motor bike races since the field of vision of the drivers is severely limited due to the occasionally extremely inclined orientation of curves.

SUMMARY OF THE INVENTION

It is a primary purpose of the invention to increase the visibility effect of the signals shown by the section observers and to increase the overall safety of motor races.

This purpose is met, at lease in part, by providing light elements, preferably directly on the rod of the flag, and by emitting the generated high energy light in the color of the respective flag cloth. By this means the visibility effect of the signal flag waved is significantly increased, even during unfavorable visual conditions, so that the drivers who are highly stressed anyway may more safely recognize the signals indicating a certain situation in the progress of the race and may react correspondingly in their driving conduct.

According to a further embodiment of the invention, a further increase in visibility is obtained by forming the light elements provided individually, or preferably in groups, on the respective flag rod as electric blinking lamps emitting more or less directed halogen light. As known, for example, from the rear reflectors of airplanes or also from safety equipment in street traffic, the effect of visibility of lamps is increased by the repetitive blinking of the lamps. For the same purpose, the respective colors of the flag cloth and, if necessary, also the flag rod, may be reflective or phosphorescent, or both, so that they remain visible due to the partial illumination by the blinking lamps.

A simple handling of the signal flags is advantageously realized by providing an individual energy supply for the light elements of each flag rod, for example, advantageously in the form of rechargeable electric batteries which may be connected to the respective light elements by means of an on/off switch located or the flag rod adjacent to the handle. On the other hand, there is, of course the possibility to connect each individual flag to a control unit and its energy supply via a cable weighing as little as possible.

Efficaciously, a special accommodation including individually designated mounts, for example, in the shape of clamps, for the individual signal flags is respectively provided for one signal flag set comprising, for example, six flags. Electronic switching functions may be assigned to the individual elements of those mounts so that the batteries of the individual signal flags may be recharged during the times of their accommodation.

The subject matter of the invention is further a signalling system for motor racing which is based on the predetermined number of signal flags formed according to the invention and comprises a blinking device including blinking lamps emitting light in the colors of the signal flags as well as an electric control device for operating the signal flags and the blinking device in addition to the signal flags to be positioned in the designated mounts on a common accommodation.

The blinking device is automatically switched on simultaneously with the respective signal flag and emits light with a high intensity in the colors of the respective signal flag in the direction of the approaching vehicles. The blinking effect of this blinking device preferably formed of groups of blinking lamps having the same color increases the visibility of the signals given by the section observer. Efficaciously, this blinking device is mounted on an individual post so that it may also be positioned in a certain distance from the section observer. The electronic control device not only serves the supply of electric energy but also coordinates the operations of switching on and off the respective signal flag and the associated group of blinking lamps of the blinking device.

A special aspect of the signalling system according to the invention with respect to a most simple and reliable operation rests in a special arrangement of the accommodation for the signal flags, the mounts of which have also an electronic switching function so that by removing a flag from the mount the blinking lamps provided on its rod as well as the associated groups of lamps of the blinking device are turned on. As soon as the respective signal flag is returned to the associated mount of the accommodation by the section observer, a deactivation is effected and thus the blinking lamps of the signal flag as well as of the blinking device are turned off.

In a particularly advantageous further development of the invention, the signalling system may be communicatively linked to the control center, typically located off the racing course, for example, via laid cables, direct radio transmission or satellite transmission. Any operation of a signal flag by the section observer is automatically transmitted to the control center via this communications link so that the race management is always informed of all activities of the section observers and thus of the complete progress of the race. On the other hand, this communications link makes it possible for the race management to issue acoustic or optical instructions to the respective section observers, for example, to wave the red or yellow signal flag on each section of the course after heavy accidents to signal pending danger or the termination of the race to all drivers almost simultaneously. In addition, there is also a possibility that the race management may activate certain blinking lamps on the respective flag mounts via the respective control devices of the used number of signalling systems to inform the section observer in this way that he is to wave the signal flag thus indicated. The associated blinking lamps of that flag, as well as the corresponding group of lamps on the blinking device, are simultaneously activated. For the purpose of data or signal transmission, the electric control unit of the signalling system is efficaciously provided with a receiver or transmitter or receiver/transmitter unit for the optical or acoustic signals.

A further important aspect of the invention is that the signalling systems for the individual section observers are linked to the electronic data processing equipment of the control center so that the data transmitted from said signalling systems are stored in the electronic data processing equipment and are processed together with other data arrays. Such other data arrays may, for example, originate from induction loops laid out in predetermined sections of the racing course and concertedly register the passing of each racing car by co-operating with the transponder inherent to the same. By a programmed processing of the thus obtained data the complete racing event may be electronically detected and stored for later use as well as displayed on appropriate monitors in addition to television screens. In addition, there arises the practically important option of controlling the regulations over the complete racing event, even after the termination of the respective race, for example, within the framework of opposition proceedings or for imposing punitive measures against individual drivers. This also applies to training rounds in the course of which the drivers are to observe certain rules as well. For example, best times in rounds driven during the time trials are not acknowledged when during the training drive one of the section observers has shown the yellow signal flag signaling danger. Since the exposition or activation of that yellow flag will be registered by the electronic data processing equipment of the control center and, additionally, the signals generated by the induction loops laid out in the track with any passage due to the vehicle inherent transponders are also sent to the data processing equipment, by an appropriate linking or processing of those received data any violation of the rules by a driver who, for example, has passed a driver driving in front of him after a yellow signal flag has been waved, can be unmistakably determined and recorded.

BRIEF DESCRIPTION OF THE DRAWING

The objects, advantages and features of the invention will be more readily appreciated from following detailed description, when read in conjunction with the accompanying drawing, wherein.

DETAILED DESCRIPTION OF THE PREFERRED EMBODIMENTS

Figure 1:
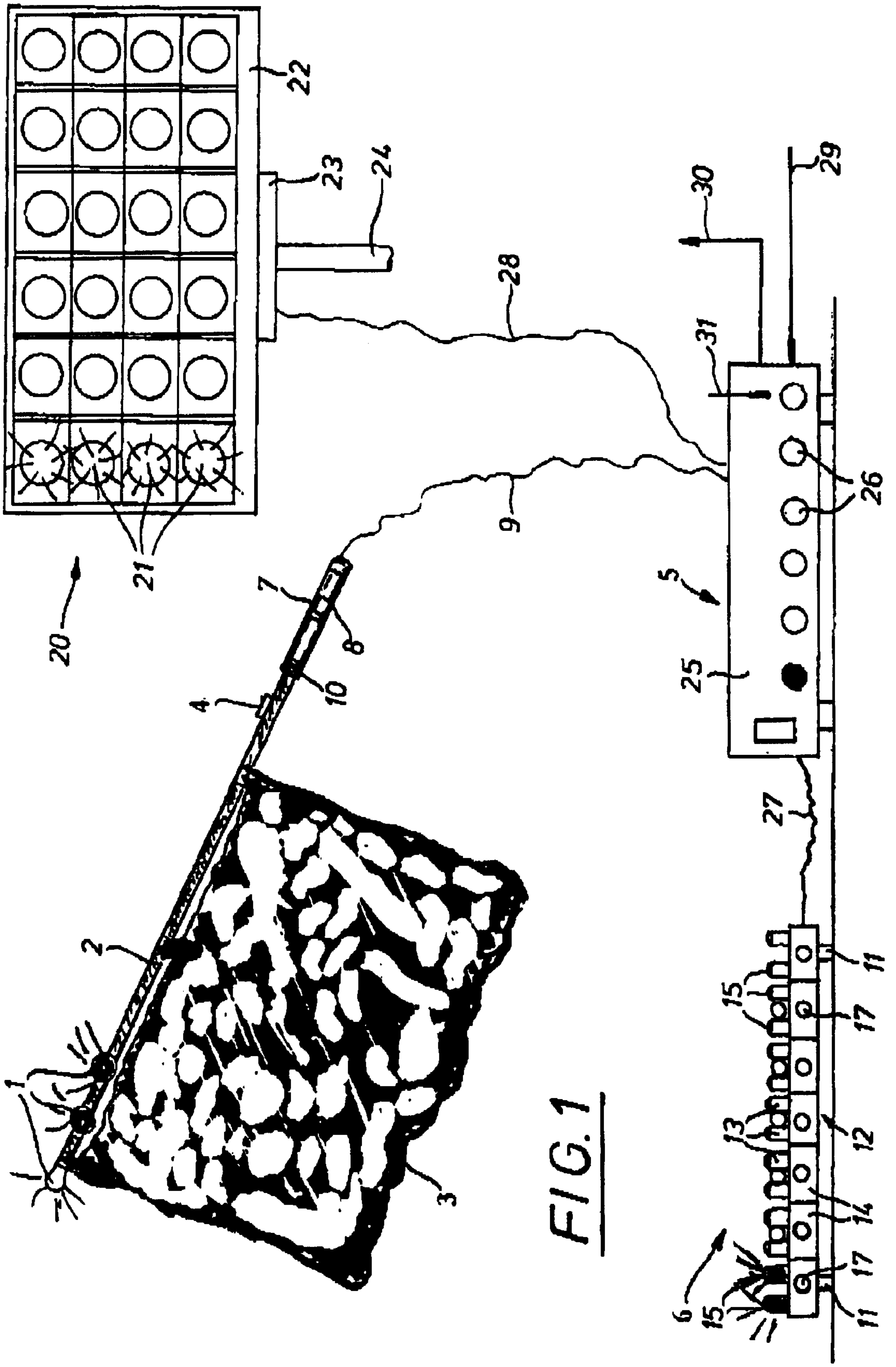
FIG. 1 roughly schematically shows a signal flag including constructional elements of a signalling system in accordance with the invention.

The signal flag shown has the dimensions of conventional signal flags for section observers and consists of a lightweight flag rod 2 having a flag cloth 3 of a color prescribed by the regulations attached thereto. On the flag rod are mounted a multitude of blinking lamps 1 that emit light flashes of high intensity in the color of the flag cloth. As light generators of the blinking lamps, preferably so called halogen bulbs having appropriate reflectors are used. As compared to conventional signal flags the visibility effect is increased many times by the blinking operations of the lamps and by their high light performance. To obtain a further enhancement of the visibility effect the flag rod is also painted in the color of the flag cloth, the colors used preferably having reflective and/or fluorescent properties. For the current supply of blinking lamps 1, efficaciously batteries 8 shown by a dot chain line are provided in handle 7 of the flag rod, the batteries are connected to the blinking lamps via electric cables extending within the flag rod, and controlled by switch 4. The current supply of the blinking lamps may also be effected via highly flexible cable 9 connecting the flag rod with control unit or device 5. On flag rod 2, efficaciously at the junction from handle 7 to the actual rod, a contact switch 10 is disposed which connects batteries 8 with blinking lamps 1 via turned-on switch 4 upon release of the signal flag from a mount described in detail below. Further, the charging current may be supplied to rechargeable batteries 8 via this switching contact 10 and the mounts of the flag accommodation.

In the drawing, further, flag accommodation or rack 6 is schematically shown which serves to releasably accommodate a signal flag set predetermined by the respective regulations comprising, in the illustrated example, six signal flags in respectively prescribed colors. The flag accommodation has a base which is illustrated as legs 11 here but may also consist of a fixed or collapsible stand, pedestal or the like. On the upper side of carrier 12, pairs of clamping mounts 13 are provided, respectively, between which, for example, flag rod 2 of a respective signal flag may be clamped. An end spar of carrier 12, which is not shown here, is also provided with respective pairs of clamping mounts into which the ends of the flag rods of the respective flags are clamped. Rack 6 has blinking lamps 15 incorporated in the clamping mounts in the illustrated example for each of its total of seven reception segments 14. These blinking lamps emit a colored light corresponding to the color of the associated signal flag. Further a manually operable electric switch 17 is provided in each flag segment 12 of the accommodation by the operation of which switch the section observer may deactivate one or more flag segments of the accommodation, in this case, for example, the seventh flag segment on the outer right side.

The illustrated signalling system further includes blinking device panel 20 comprising six groups of blinking lamps 21 disposed above each other in the illustrated example. These blinking lamps preferably contain so called halogen bulbs, including reflectors, each group of lamps emitting light with high intensity in the color of one of the signal flags, respectively. Blinking lamps 21 are installed in housing 22 resting on stand 24 via carrier plate 23 formed as a turning disk if appropriate. By a corresponding formation of the base of the stand the blinking device can be located at a position particularly well visible to the drivers even in a distance from flag accommodation 6 or the shelter of the section observer.

The control of the functional operations of the signal flags as well as blinking device 20 is effected with the aid of control unit 5 which is formed as a separate transportable device here but may, for example, also be incorporated in the base of flag accommodation 6. On a display board 25 of control unit 5 colored lamps 26 are provided which emit light in the color of an associated signal flag in an activated state. Control unit 5 is further connected to the flag accommodation via cable 27 and to blinking device 20 via cable 28. Cables 27, 28 serve to supply current as well as to transmit control instructions. For the current supply to the whole system there is provided a mains supply 29 leading to control unit 5. The control unit for the data and information exchange with the control center (not shown in FIG. 1) of the racing course is provided with cables 30 and an antenna 31 for a cable free transmission via direct radio transmission or satellite transmission.

Operation of the signalling system shown in the drawing and detailed above is described in the following way.

Previous to the race or the training the components of the system, that is, flag accommodation 6, control device 5 as well as the blinking device are positioned at the section observer locations determined by the race management. Since modern racing courses are provided with a multitude of cable channels extending underground, control devices 5 may be connected to the electronic data processing equipment of the control center via control cables 30 as well as to the supply network via cable 29. A data transmission by means of antennas 31 of the control devices is generally impossible since the radio frequencies required therefore are occupied most of the time. When, during the race, the respective section observer receives the instruction to, for example, interrupt the race from the race management at the control center, he takes the red signal flag shown in the drawing from outermost left flag segment 14 of flag accommodation 6. By taking that flag out of clamping mounts 13 electrically connected to control unit 5, clamping switch 10 on the flag rod is activated, and the electric batteries disposed in handle 7 of the flags are automatically connected to blinking lamps 1 so that the blinking lamps are illuminated immediately after having been taken out. Simultaneously, red blinking lamps 21 associated with the outermost left group of blinking device 20 are turned on. Due to the lighting performance of blinking lights 1 of the signal flag waved by the section observer on the one hand, as well as the much more light intensive blinking lamps 21 of blinking device 24 directed to the immediate field of vision of the driver, it is assured that the drivers will recognize the signals given by the section observer also in the case of extremely unfavorable visual conditions. By returning flag 2 into the associated clamping mount 13 of flag accommodation 6 the blinking lamps of the signal flag as well as blinking lamps 21 of blinking device 24 are turned off. Simultaneously, however, an electric connection between batteries 8 and control unit 5 is established so that the batteries are recharged in the deposited state of the flags.

In certain racing situations the respective section observer may, of course, also decide individually that the one or the other signal flag is to be waved, for example, in case of a contaminated track in this section of the racing course. In this case also blinking lamps 1 on flag rod 2 as well as blinking lamps 21 on blinking device 20 are automatically operated in the way described above by taking the respective signal flag from its accommodation 6. In addition, however, the release process is transmitted to the electronic data processing equipment of the control center in the form of the corresponding information data via cable 30 or via antenna 31 so that the race management may be informed of this process by corresponding signals. If, on the other hand, instructions from the race management at the control center are given to an individual or all section observers, the transmission to the respective control units 5 is also effected via control cable 30 or the antenna. Lamp 26 of the control unit corresponding to the respective instruction is then turned on to indicate to the section observer which flag he is to take out of the accommodation. Of course the instructions of the race management may also be transmitted to the respective section observer acoustically, for example, by means of headphones.

The use of the above described signalling system for the first time enables an observation and recording of the complete progression of a race independent of the so far generally used television recordings. In motor racing, most of the time all the vehicles are provided with an individual transponder, and in the tracks themselves numerous induction loops are laid out. Upon passing the induction loops, data characterizing a vehicle will be transmitted to the central computer as well as to the electronic data processing equipment of the racing club so that the vehicle is detected on nearly every section of the course. Such data may be processed in the central computer via the time detection. Since the data concerning the actions of the section observers are also transmitted to the central computer by the signalling system described above the racing processes controlled or influenced by the section observers due to their signalling may be linked to the data received from the induction loops in the computer. The results of this data processing represent the exact progression of the race. This does not only enable an exact observation of the individual vehicles during the race, for example, with the aid of displays on monitors, but also enables a retrieval of the race after the termination of the race, for example, in opposition proceedings and/or in case of the imposition of punitive measures against individual drivers. For example, it may without difficulty be proved with the aid of the processed and recorded data whether a best time for a round which may then not be rated has been achieved during time training while a yellow signal flag was shown. So far such events could only be controlled by television recordings. The corresponding also applies to a case in which a driver to be passed doesn't let a faster vehicle pass within two to three rounds after the blue signal flag has been shown, which could so far only be detected insufficiently. Due to the combined detection of the signalling action of the section observers and the signals from the induction loops it can now unmistakably be detected whether or not such a passing or lapping process has been completed within the prescribed two to three rounds.

Even shortly after the beginning of a race the section observers can lose oversight over the progression of the race due to pit stops and changes of positions of the vehicles. Information and instructions for showing a certain signal flag will so far be received via radio transmission which, however, has been proved to be unreliable due to the extremely high noise level of the passing racing cars. With the signalling system according to the invention, the race management may now instruct the respective section observer with the blinking lamps disposed on his control unit 5 or the blinking lamps located on the signal accommodation for indicating a certain signal flag provided with blinking signals according to the invention and the corresponding blinking lamps of the blinking device. In the central electronic data processing equipment not only that instruction but also the observation of the instruction by the individual section observer is recorded so that the actions of the individual section observers may also be controlled by the race management during the race or after its termination. The respective section observer recognizes those instructions either by acoustic signals in his headphones (audible verbal instructions) or by a blinking of the respective lamps on control unit 5 or on the provided accommodation 6. Upon the termination of those light signals the section observer is to return the signal flag to the accommodation, this process also being registered in the central computer. Since each section observer has an individual identification and each flag has an individual address, the progress of the race may almost completely be observed and recorded on the complete racing course.

Figure 2:
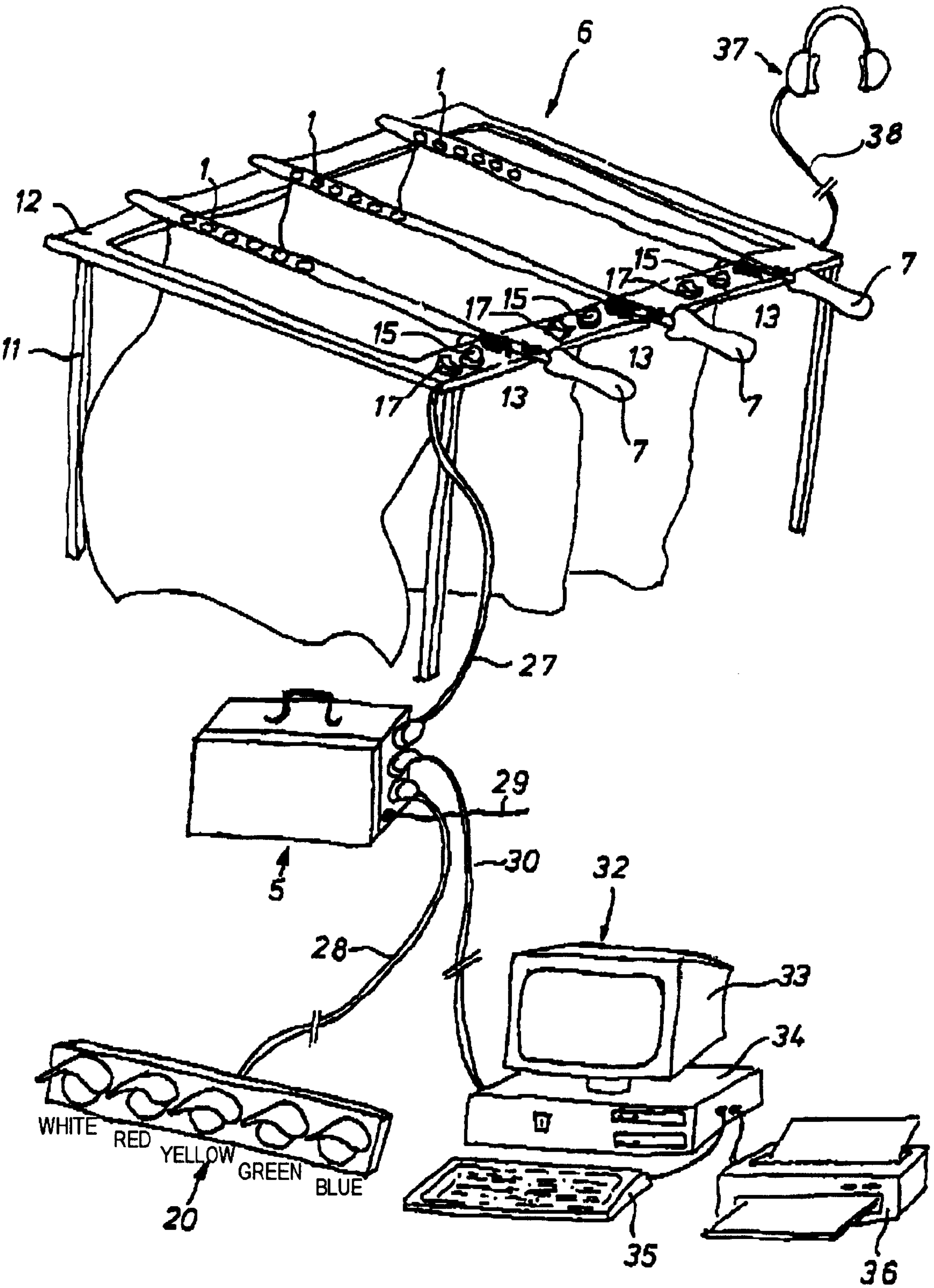
FIG. 2 shows a signalling system of the invention with the signal flags accommodated therein.

The signalling system shown in FIG. 2 corresponds to the only roughly and schematically shown signalling system of FIG. I in its basic structure, identical components being identified by the same numerals as used in FIG. 1. In addition, a conventional personal computer (PC) 32 including monitor 33, processing unit 34 and keyboard 35, as well as printer 36 connected to PC 32 are shown. The PC and related apparatus can effectively be the control center described with respect to FIG. 1, and can be located close to or in the vicinity of the racing course. Further, headphones 37 provided for the section observer and connected to the electronics of accommodation 6 via cable 38 are shown. In this embodiment switches 17 on frame 12 of accommodation 6 serve to switch on or off blinking device 20 in special cases.

The invention is not limited to the embodiments shown. Thus, the different components of the signalling system may—in contrast to the ones shown—not be formed as transportable individual devices, respectively, but they may also be mounted as a complete equipment either at fixed operating locations or on mobile platforms. Further, the application of the signalling system of the invention is not limited to the so called round course races but also includes street races, rallies or the like, in which latter cases the fixed installation of the signal flag accommodation, the control unit and, if necessary, also the personal computer on a common platform, for example also on a special vehicle, is recommendable.

What is claimed is:

1. A signalling system for motor racing operable by section observers on a racing course, said system comprising:

a predetermined number of signal flags in different colors to be shown by the respective section observer in certain racing situations;

a common accommodation including mounts for said individual signal flags; and a blinking device panel provided with blinking lamps emitting light in the colors of the corresponding said signal flags; and an electronic control unit for the operation of said signal flags and said blinking device panel.

2. The system according to claim 1, and further comprising a control center, said control unit being communicatively connected to said control center for the race course for exchanging instructions and information.

3. The system according to claim 2, and further selectively comprising a receiver unit and transmitter unit for communicating signals between said control center and said control unit.

4. The system according to one of claims 1, 2, or 3, and further comprising a blinking lamp for each said signal flag coupled to said flag accommodation, each said blinking lamp emitting light in the same color as each corresponding said signal flag.

5. The system according to claim 4, wherein said blinking lamps on said flag accommodation selected by said control center may be activated as an instruction for the section observer to take a specified said signal flag out of said accommodation.

6. The system according to claim 5, wherein upon the release of a one said signal flag from said accommodation the blinking lamps in the signal color of said signal flag, as well as the associated said blinking lamps of said blinking device, are automatically activated.

7. The system according to claim 2, and further comprising:

a blinking lamp mounted to each said signal flag;

an electric switching arrangement allocated to each said signal flag as well as to its mount in said accommodation; and a battery;

said switching arrangement establishing an electronic connection between said battery and said blinking lamp as well as a communications link to said control center via said control unit when said signal flag is removed from said accommodation.

8. The system according to claim 3, wherein said receiver unit comprises headphones for the section observer.

9. The system according to claim 1, and further comprising a respective manually operable switch for each said signal flag for purposefully switching on and off said blinking device on said accommodation.

10. The system according to claim 1, wherein individual components including said accommodation, said blinking device and said control unit are formed as transportable individual parts.

11. The system according to claim 1, and further comprising:

induction loops spaced along said racing course;

said control center comprising at least one electronic computer into which all data, instructions and information of said signalling system, as well as data from said induction loops laid out on said racing course are input, said computer determining the exact progress of a race for each individual vehicle by a linked processing of those data according to a corresponding program in said computer, displaying the same on a monitor and recording it for later retrieval.

12. A signal flag apparatus for motor racing, particularly for the section observers on racing courses, said apparatus comprising:

at least one flag comprised of a colored flag cloth and a flag rod with a handle;

at least one light emitting element for emitting light in the color of said flag cloth being mounted on said flag rod, said at least one light having a high intensity;

an accommodation for a prescribed number of said signal flags, said accommodation comprising designated mounts for the individual ones of said signal flags; and an energy supply and electric switching contacts for electrically connecting said energy supply of each said signal flag to its corresponding said light emitting element.

13. The apparatus according to claim 12, said accommodation further comprising:

blinking lamps in the respective signalling colors corresponding to said signal flag colors; and manually operable electric switches allocated to said mounts for said signal flags disposed on said accommodation.

14. A signal flag apparatus for motor racing, particularly for the section observers on racing courses, said apparatus comprising:

at least one flag comprised of a colored flag cloth and a flag rod with a handle;

at least one light emitting element for emitting light in the color of said flag cloth being mounted on said flag rod, said at least one light having a high intensity, wherein said at least one light emitting element comprises a blinking lamp disposed on said flag rod;

an accommodation for a prescribed number of said signal flags, said accommodation comprising designated mounts for the individual ones of said signal flags; and an energy supply and electric switching contacts for electrically connecting said energy supply of each said signal flag to its corresponding said light emitting element.

15. The apparatus according to claim 14, said accommodation further comprising:

blinking lamps in the respective signalling colors corresponding to said signal flag colors; and manually operable electric switches allocated to said mounts for said signal flags disposed on said accommodation.

* * * * *